UNITED STATES PATENT OFFICE 2,049,214

CARBON COMPOUNDS OF THE 1:9-ANTHRA THIOPHENE SERIES

Ralph Norbert Lulek, Wilmington, Del., assignor to E. I. du Pont de Nemours & Company, Wilmington, Del., a corporation of Delaware No Drawing. Application October 23, 1931, Serial No. 570,765

16 Claims. (Cl. 260—53)

This invention relates to carbon compounds and processes for their production. More particularly it relates to dyes and dye intermediates of the 1:9-anthra-thiophene series. It especially contemplates compounds having the probable formula:

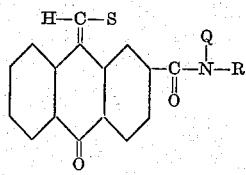

in which R represents a carbon compound radical, residue or nucleus and Q represents hydrogen or a carbon compound radical, residue or nucleus.

An object of this invention is the production of new and valuable chemical compounds. Other objects are to produce new dyes, new dye intermediates, new chemical processes, and in general to advance the art. Other objects will appear hereinafter.

These objects are accomplished by the following processes. An alkali metal salt of 1-mercapto-anthraquinone-2-carboxylic acid, having the probable formula:

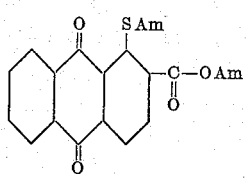

in which Am represents an alkali metal, is treated with mono-chlor-acetic acid in aqueous alkali to produce the corresponding alkali metal salts of 1:9-anthra-thiophene-2-carboxylic acid, having the probable formula:

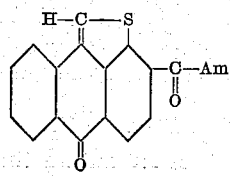

The resultant compound is converted to an acid halide having the probable formula:

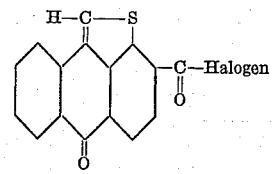

and the acid halide is thereafter condensed with an amine, having the probable formula:

in which R represents a carbon compound radical, residue or nucleus and Q represents hydrogen or a carbon compound radical, residue or nucleus, to give compounds having the probable formula:

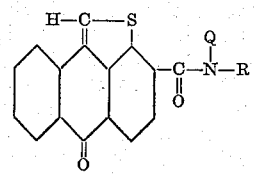

in which R represents a carbon compound radical, residue or nucleus and Q represents hydrogen or a carbon compound radical, residue or nucleus.

The invention will be further understood from a consideration of the following examples in which the parts are given by weight.

*Preparation of 1:9-anthra-thiophene-2-carboxylic acid*

Example I

Ten (10) parts of the sodium salt of 1-mercapto-anthraquinone-2-carboxylic acid were dissolved in 200 parts of water under the addition of alkali and a solution of 3.5 parts of mono-chloracetic acid in weak alkali added. The solution was boiled for several hours during which time the blue color of the sodium salt of the mercapto compound gradually disappeared and the solution took on a brown coloration. After the reaction was complete the hot solution was filtered and the filtrate acidified with hydrochloric acid. The precipitated compound, which was 1:9-anthra-thiopheno-2-carboxylic acid (1:9-thiopheno-anthrone-2-carboxylic acid) was filtered off and washed free from acid. This compound is a yellow powder soluble in most organic solvents with a yellow color and soluble in concentrated sulphuric acid with a cherry-red color. The compound has the probable formula:

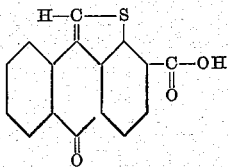

*Preparation of carbonyl halide*

*Example II*

Ten (10) parts of 1:9-anthra-thiophene-2-carboxylic acid were suspended in 100 parts of benzene and 10 parts of phosphorus penta-chloride were added. The temperature was raised to the boiling point of the solvent and maintained for two hours. Thereafter the product was cooled and the corresponding acid halide, namely, 1:9-anthra-thiophene-2-carbonyl chloride filtered off. This product is a yellow powder somewhat lighter in color than the free acid.

The above described process is not limited to the particular solvents set out since other solvents, for example, xylene and nitrobenzene may be used. The phosphorus penta-chloride may be replaced by other reagents producing a like reaction, for example, thionyl chloride.

*Condensation with amines*

*Example III*

Ten (10) parts of 1:9-anthra-thiophene-2-carbonyl chloride were suspended in 150 parts of nitrobenzene and 7.5 parts of alpha-amino-anthraquinone added. The resultant solution or suspension was heated to 130–140° C. and this temperature maintained for one hour. Thereafter the reaction mass was cooled to 50° C. and the product filtered and washed. This compound exists as yellow crystals, is soluble in sulphuric acid with a cherry-red color and dyes cotton yellow shades from a red alkaline hydrosulphite vat. The reaction taking place is illustrated by the following probable equation:

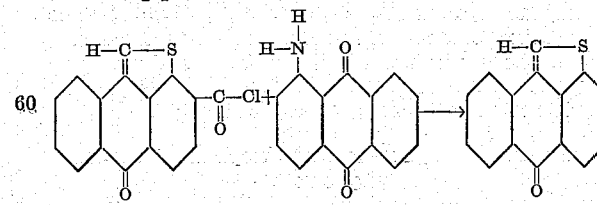

The alpha-amino-anthraquinone may be replaced by other amines. For example, excellent results are obtained with aniline, alpha-naphthylamine, beta-naphthylamine, beta-amino-anthraquinone, Bz-1 amino benzanthrone, methyl aniline, naphthyl-phenyl-amine, di-butyl-amine, piperidine, beta-amino-phenazine, 1:9-anthra-isothiazole-4-amine, 1:9-anthra-isoselenazole-5-amine and the like. The particular temperatures and time of reaction depend upon the specific compounds being condensed. These may readily be determined by one skilled in the art. The quantities of materials used will, of course, vary depending upon the molecular weights of the reacting compounds. This reaction is not limited to the specific suspension agent mentioned above. Any desired suspension agent (solvent) may be used. Specific mention may be made of the di-chloro-benzenes and xylene. The reaction temperature set out above has been found most desirable for the specific compounds utilized. It will be understood, however, that a reaction takes place at other temperatures ranging from room temperature to the point of decomposition of the particular compounds being treated.

*Example IV*

Ten (10) parts of 1:9-anthra-thiophene-2-carbonyl chloride were heated with 8.5 parts of 1-amino-6-chloro-anthraquinone in 150 parts of nitrobenzene at 130–140° C. The condensation product separated in the form of yellow needles and was filtered at 70° C. It exists as a yellow powder, is soluble in concentrated sulphuric acid with a red color and dyes cotton from a red vat in yellow shades somewhat more intense than the dye obtained from alpha-amino-anthraquinone.

The 1-amino-6-chloro-anthraquinone may be replaced, with appropriate adjustment of the quantities of materials treated, the temperatures, solvents and time of treatment utilized, by other amines. Very desirable results are obtained with such compounds as the nitranilines, the bromanilines, para-anisidine, 1-amino-4-bromo-anthraquinone and the like.

*Example V*

Ten (10) parts of 1:9-anthra-thiophene-2-carbonyl chloride and 11.5 parts of mono-benzoyl-1:5-di-amino-anthraquinone were heated in nitrobenzene for two hours at about 140–150° C. The reaction mass was then cooled to 80° C., filtered and washed. The resultant condensation product dyes cotton in reddish-yellow shades. The final product has the probable formula:

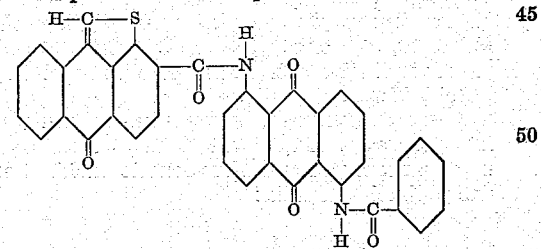

Similar to the preceding examples with suitable

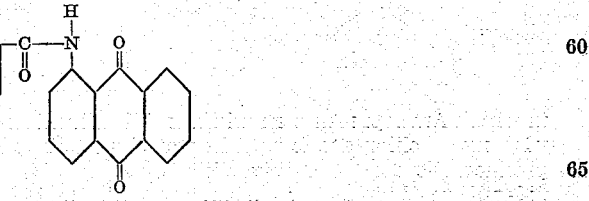

adjustment of the reactants and the conditions the mono-benzoyl-1:5-di-amino-anthraquinone can be replaced by other amines. Special mention may be made of such compounds as 1:5-di-amino-anthraquinone, 1:4-di-amino-anthraquinone, meta-phenylene-di-amine, benzidine and the like.

*Example VI*

Ten (10) parts of 1:9-anthra-thiophene-2-carbonyl chloride were heated with 9 parts of 1-amino-anthraquinone-6-carboxylic acid in 150 parts of nitrobenzene at about 140° C. The mass was held at this temperature for one and one-half hours and then cooled to 50° C. and filtered. The separated material was thereafter washed and dried. Similar to the preceding examples with suitable adjustment of the reactants and the conditions the 1-amino-anthraquinone-6-carboxylic acid may be replaced by other amines. Attention may be directed to the results obtainable with such compounds as the amino-benzoic acids, 1-amino-anthraquinone-7-carboxylic acid, and the like. The products described in this example are especially valuable because of the carboxyl group in the final product. These compounds may be converted to the corresponding acid halides and thereafter condensed with amino compounds to produce valuable chemical compounds.

Especially valuable dyestuffs are produced in accordance with the preceding examples. These dyestuffs are of a new type which dye cotton in fast shades.

As many apparently widely different embodiments of this invention may be made without departing from the spirit and scope thereof, it is to be understood that I do not limit myself to the specific embodiments thereof except as defined by the appended claims.

I claim:

1. The chemical compound having the formula—

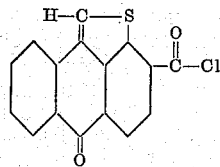

2. The chemical compound having the probable formula—

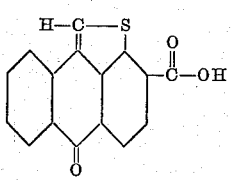

which is a yellow powder, soluble in solvents with a yellow color and which gives cherry-red solutions in sulphuric acid.

3. The process which comprises treating 1-mercapto-anthraquinone-2-carboxylic acid in the form of the alkali metal salt with a halo-acetic acid to produce 1:9-thiophene-anthrone-2-carboxylic acid.

4. The chemical compound having the formula—

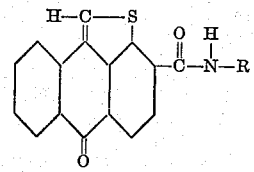

in which R represents a carbon compound radical.

5. The process which comprises condensing the compound having the formula—

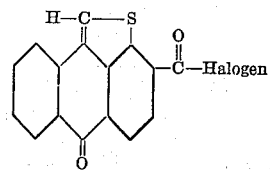

with the compound having the formula—

in which R respresents a carbon compound radical and Q represents hydrogen or a carbon compound radical.

6. The chemical compound having the formula—

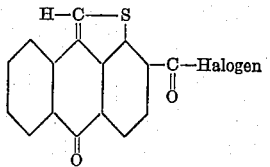

which is a yellow powder.

7. The chemical compound having the formula—

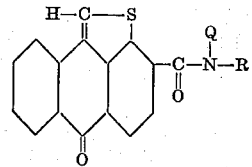

in which R represents a carbon compound radical, and Q represents hydrogen or a carbon compound radical.

8. The chemical compounds having the formula—

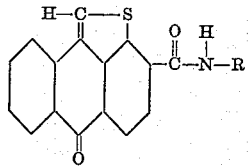

in which R represents a cyclic carbon compound radical.

9. The chemical compound having the formula—

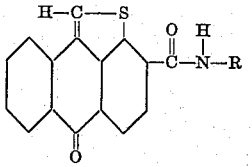

in which R represents an acyclic carbon compound radical.

10. The product probably having the formula—

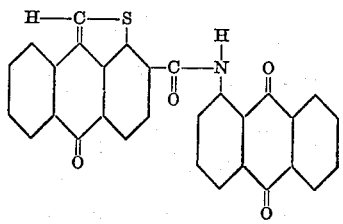

which is substantially identical with the product obtainable by suspending 10 parts of 1:9-anthrathiophene-2-carbonyl chloride in 150 parts of nitrobenzene, adding 7.5 parts of alpha-amino-anthraquinone, heating to 130°–140° C. for one hour, cooling to 50° C. and filtering, which product is a vat dye capable of existing as yellow crystals, vatting in alkaline hydrosulfite to give a red solution, dissolving in sulfuric acid to give a cherry red solution and dyeing cotton in fast yellow shades.

11. The product probably having the formula:

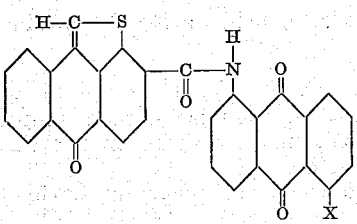

in which X represents a hydrogen atom or a benzoyl-amino radical, the said products being substantially identical with the products obtainable by suspending 1:9-anthra-thiophene-2-carbonyl-chloride in nitro-benzene, adding a 1-amino-anthraquinone which may contain a benzoyl-amino radical in the 5 position, heating and filtering, which said products are vat dyes capable of dyeing cotton fast yellow shades from alkaline hydrosulfite vats.

12. Vat dyestuffs corresponding probably to the general formula:

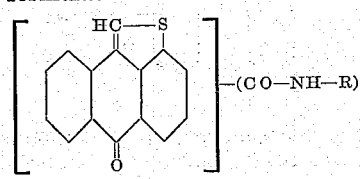

wherein R means the radical of a cyclic aromatic ketone, containing at least three condensed benzene nuclei, which products are valuable dyestuffs capable of being vatted and dyeing the vegetable fiber fast shades depending on the amine used for the condensation and ranging from yellow to violet, which dyestuffs are distinguished by a good fastness to chlorine and washing and partially to light.

13. Vat dyestuffs corresponding probably to the general formula:

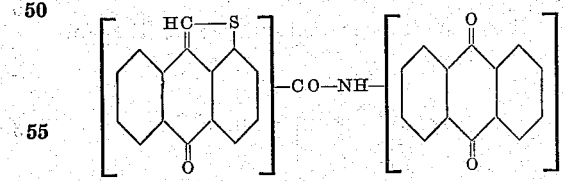

wherein the anthraquinone radical may contain a further aromatic acylamino-group, which products are valuable dyestuffs capable of being vatted and dyeing the vegetable fiber fast shades depending on the amine used for the condensation and ranging from yellow to brown, which dyestuffs are distinguished by a good fastness to chlorine and washing and partially to light.

14. Vat dyestuffs corresponding probably to the general formula:

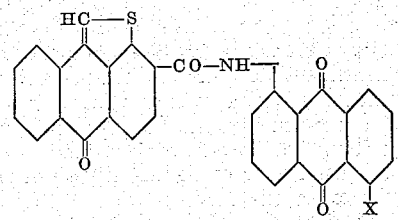

wherein X means hydrogen or a benzoylamino-group, which products are valuable dyestuffs capable of being vatted and dyeing the vegetable fiber yellowish shades of a good fastness to chlorine washing and to light.

15. Vat dyestuffs corresponding probably to the general formula:

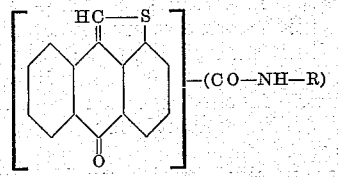

wherein R means the radical of a cyclic aromatic ketone containing at least three condensed benzene nuclei, said ketone being substituted by an aromatic acyl-amino group, which products are valuable dyestuffs capable of being vatted and dyeing the vegetable fiber fast shades depending on the amine used for the condensation and ranging from yellow to violet, which dyestuffs are distinguished by a good fastness to chlorine and washing and partially to light.

16. A vat dyestuff corresponding to the following probable formula:

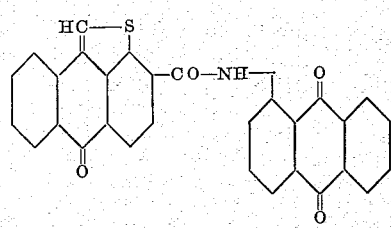

which product may be obtained in the form of yellow crystals capable of being vatted and yielding an orange-brown vat from which vegetable fibers are dyed strong yellow shades of good fastness properties.

RALPH N. LULEK.

CERTIFICATE OF CORRECTION.

Patent No. 2,049,214. July 28, 1936.

RALPH NORBERT LULEK.

It is hereby certified that error appears in the printed specification of the above numbered patent requiring correction as follows: Page 1, first column, line 7, in the formula, insert a bond between "S" and the third benzene ring; and that the said Letters Patent should be read with this correction therein that the same may conform to the record of the case in the Patent Office.

Signed and sealed this 15th day of December A. D. 1936.

Henry Van Arsdale (Seal) Acting Commissioner of Patents.